US007540666B2

(12) United States Patent
Luther et al.

(10) Patent No.: US 7,540,666 B2
(45) Date of Patent: Jun. 2, 2009

(54) ARTICULATED FORCE APPLICATION FOR MULTI-FIBER FERRULES

(75) Inventors: James Phillip Luther, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/711,266

(22) Filed: Feb. 27, 2007

(65) Prior Publication Data
US 2008/0205823 A1 Aug. 28, 2008

(51) Int. Cl.
*G02B 6/38* (2006.01)
(52) U.S. Cl. .................. 385/59; 385/60; 385/62
(58) Field of Classification Search .......... 385/56, 385/58, 83, 89
See application file for complete search history.

(56) References Cited

U.S. PATENT DOCUMENTS

| | | | | |
|---|---|---|---|---|
| 1,503,266 A | * | 7/1924 | Jacobs | 337/211 |
| 4,303,300 A | * | 12/1981 | Pressiat et al. | 385/26 |
| 4,428,031 A | * | 1/1984 | Mori | 362/576 |
| 4,568,145 A | * | 2/1986 | Colin et al. | 385/75 |
| 4,611,887 A | * | 9/1986 | Glover et al. | 385/71 |
| 4,787,706 A | * | 11/1988 | Cannon et al. | 385/59 |
| 5,082,346 A | | 1/1992 | Myers | 385/54 |
| 5,095,517 A | * | 3/1992 | Monguzzi et al. | 385/90 |
| 5,214,830 A | * | 6/1993 | Rozycki | 29/240 |
| 5,309,330 A | * | 5/1994 | Pillers et al. | 362/574 |
| 5,419,707 A | * | 5/1995 | Kelley | 439/21 |
| 5,590,229 A | * | 12/1996 | Goldman et al. | 385/59 |
| 5,687,268 A | * | 11/1997 | Stephenson et al. | 385/73 |
| 5,743,731 A | * | 4/1998 | Lares et al. | 433/29 |
| 5,873,750 A | * | 2/1999 | Cairns et al. | 439/587 |

(Continued)

FOREIGN PATENT DOCUMENTS

WO        WO97/34176        9/1997

(Continued)

OTHER PUBLICATIONS

Patent Cooperation Treaty, International Search Report for International Application No. PCT/US08/002477, Jun. 18, 2008, 3 pages.

*Primary Examiner*—James P Hughes
*Assistant Examiner*—Peter Radkowski

(57) ABSTRACT

The present invention provides a multi-fiber fiber optic connector assembly providing articulated force application, including: a ferrule holder including an x-pivot component and a y-pivot component, wherein the x-pivot component of the ferrule holder is operable for providing relative rotational movement about the x-axis of the multi-fiber fiber optic connector assembly and the y-pivot component of the ferrule holder is operable for providing relative rotational movement about the x-axis of the multi-fiber fiber optic connector assembly; a multi-fiber ferrule comprising a plurality of optical connection points coupled to the ferrule holder; and a biasing member coupled to the ferrule holder and the multi-fiber ferrule, wherein the biasing member is operable for transferring a force through the ferrule holder and to the multi-fiber ferrule, and wherein the y-pivot component of the ferrule holder is coupled to the biasing member, the x-pivot component of the ferrule holder is coupled to the y-pivot component of the ferrule holder, and the multi-fiber ferrule is coupled to the x-pivot component of the ferrule holder.

22 Claims, 12 Drawing Sheets

U.S. PATENT DOCUMENTS

| | | | | |
|---|---|---|---|---|
| 5,933,557 | A * | 8/1999 | Ott | 385/86 |
| 6,076,973 | A * | 6/2000 | Lu | 385/60 |
| 6,085,003 | A * | 7/2000 | Knight | 385/59 |
| 6,108,482 | A * | 8/2000 | Roth | 385/139 |
| 6,250,818 | B1 * | 6/2001 | Loughlin et al. | 385/86 |
| 6,283,640 | B1 * | 9/2001 | Stephenson et al. | 385/58 |
| 6,402,388 | B1 * | 6/2002 | Imazu et al. | 385/60 |
| 6,524,014 | B2 * | 2/2003 | Stephenson et al. | 385/55 |
| 6,571,042 | B1 * | 5/2003 | Kordahi | 385/100 |
| 6,695,620 | B1 * | 2/2004 | Huang | 439/11 |
| 6,786,896 | B1 * | 9/2004 | Madhani et al. | 606/1 |
| 6,811,322 | B2 * | 11/2004 | Chen et al. | 385/78 |
| 6,848,862 | B1 * | 2/2005 | Schlig | 405/168.2 |
| 6,886,990 | B2 * | 5/2005 | Taira et al. | 385/78 |
| 7,077,576 | B2 * | 7/2006 | Luther et al. | 385/59 |
| 7,079,743 | B2 * | 7/2006 | Lauzier et al. | 385/134 |
| 7,145,100 | B2 * | 12/2006 | Nihei et al. | 219/121.78 |
| 7,150,567 | B1 * | 12/2006 | Luther et al. | 385/78 |
| 2001/0002220 | A1 * | 5/2001 | Throckmorton et al. | 385/66 |
| 2002/0081878 | A1 * | 6/2002 | Bruno | 439/164 |
| 2003/0036748 | A1 * | 2/2003 | Cooper et al. | 606/1 |
| 2003/0044236 | A1 * | 3/2003 | Toth et al. | 405/158 |
| 2004/0105625 | A1 * | 6/2004 | Ueda et al. | 385/78 |
| 2004/0182842 | A1 * | 9/2004 | Denney et al. | 219/121.84 |
| 2004/0199052 | A1 * | 10/2004 | Banik et al. | 600/142 |
| 2005/0024532 | A1 * | 2/2005 | Choi | 348/441 |
| 2005/0069264 | A1 * | 3/2005 | Luther et al. | 385/59 |
| 2005/0220424 | A1 * | 10/2005 | Asano et al. | 385/78 |
| 2006/0204178 | A1 * | 9/2006 | Theuerkorn et al. | 385/59 |
| 2007/0025665 | A1 * | 2/2007 | Dean et al. | 385/78 |
| 2007/0149005 | A1 * | 6/2007 | Togami et al. | 439/76.1 |
| 2007/0206904 | A1 * | 9/2007 | Sezerman et al. | 385/78 |
| 2007/0211999 | A1 * | 9/2007 | Kobayashi et al. | 385/79 |
| 2008/0075407 | A1 * | 3/2008 | Saito et al. | 385/86 |

FOREIGN PATENT DOCUMENTS

| | | |
|---|---|---|
| WO | WO02/079823 A2 | 10/2002 |
| WO | WO2006/040126 A1 | 4/2006 |
| WO | WO2008/045509 A1 | 4/2008 |

* cited by examiner

ARTICULATED FORCE APPLICATION FOR MULTI-FIBER FERRULES

BACKGROUND OF THE INVENTION

1. Field of the Invention

The present invention relates generally to fiber optic connector assemblies, and more specifically, to articulated force application systems and methods for multi-fiber ferrules that take advantage of pivot point and axis selection and ferrule shoulder locations.

2. Technical Background of the Invention

Fiber optic connector assemblies including multi-fiber ferrules are used to interconnect optical fibers and devices within optical networks. Cable assemblies and network connection terminals in said networks often include receptacles for receiving connectors, such as multi-fiber connectors. Receptacles typically include receptacle housings defining internal cavities that house alignment structure for receiving and aligning a ferrule within the receptacle to a corresponding ferrule of a fiber optic connector. In some assembly examples, the alignment structure may assist in the gross alignment of the ferrules, while guide pins may be used to provide precise alignment.

As of yet, there is an unresolved need for a multi-fiber fiber optic connector assembly that minimizes problems associated with off-center force application, which may load one end of a fiber array more than the other end, ultimately causing some optical fibers to lose contact (this problem contributed to by the co-planarity deviations experienced during manufacturing). There is also an unresolved need for a multi-fiber connector assembly in which force application at the back end of the ferrule does not magnify small radial forces due to the moment arm caused by the imperfect squareness of a coil spring (i.e. the side-load component), for example. Alignment issues between the plug housing and the mating ferrule (i.e. different angles of engagement) may contribute to this side-load component, as well as misalignment due to manufacturing tolerances. Thus, the assembly of the back end of the ferrule is critical in view of the resulting force components. Further, the discrete design of a multi-fiber ferrule and boot requires the handling of two parts and allows for assembly tolerances, potentially leading to improper epoxy containment, biased alignment, or both. Finally, most current articulated designs address the x-axis due to the requirements associated with a single-row fiber array. The y-axis, however, may introduce a significant moment, causing adjoining ferrules to tilt under load. This is especially critical when applying force management to a multi-row ferrule, where the outermost row of optical fibers may act as a pivot point and cause the opposite rows to lose contact. The reduction of overall force and consequential deformation within a row also reduce the ability to compensate for co-planarity tolerances. Thus, what is needed is a connector with pivot point, axis selection and ferrule shoulder locations that addresses force application problems in conventional connector assemblies.

BRIEF SUMMARY OF THE INVENTION

In various embodiments, the present invention provides a multi-fiber fiber optic connector assembly in which ferrules and ferrule holders are "force centered" and "balanced," such that the end faces of the mating ferrules are precisely aligned with one another. In various embodiments, this is accomplished via pivot point and axis selection and ferrule shoulder locations, as is described in greater detail herein below. The present invention also provides a multi-fiber connector assembly that utilizes a "bootless" ferrule. The ferrule of the present invention incorporates a defined attachment point for an articulated force assembly and a back end extension to aide in optical fiber insertion. Force application is provided proximate the front and center of the ferrule (i.e. the center of the fiber array). A "snap" receiving geometry is designed to retain the articulated force assembly without the need for consumables. The articulated joint utilized as an attachment for the ferrule provides a spring seat, a hinge in the x-axis, and a centering mechanism in the y-axis. The centering mechanism in the y-axis minimizes the side-load component and allows the spring to assume its natural angle, for example. The front surface of the ferrule becomes the load-bearing surface. Forces are guided towards the center of the ferrule in the y-axis by a rib structure. Movement in the y-axis is limited by the ferrule geometry, providing a relatively defined position in the multi-fiber fiber optic connector assembly. The hinge in the y-axis allows for movement in the x-axis, reducing the side-load component. The spring tilt is limited by the cavity that the multi-fiber fiber optic connector assembly sits in to prevent direct force coupling to the back end of the ferrule with an excessive out-of-squareness spring. Finally, a pin-keeper may be utilized, "snapped" over the multi-fiber fiber optic connector assembly and engaging the ferrule.

In one embodiment, the present invention provides a multi-fiber connector assembly providing articulated force application, including: a ferrule holder including an x-pivot component and a y-pivot component, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly; a multi-fiber ferrule comprising a plurality of optical connection points coupled to the ferrule holder; and a biasing member coupled to the ferrule holder and the multi-fiber ferrule, wherein the biasing member is operable for transferring a force through the ferrule holder and to the multi-fiber ferrule. Preferably, the x-axis and the y-axis of the multi-fiber fiber optic connector assembly are substantially separated in the z direction. The y-pivot component of the ferrule holder is coupled to the biasing member. The x-pivot component of the ferrule holder is coupled to the y-pivot component of the ferrule holder. The multi-fiber ferrule is coupled to the x-pivot component of the ferrule holder. Preferably, the biasing member comprises one of a coil spring and a wave spring. The assembly also includes a shoulder structure integrally formed with the multi-fiber ferrule and disposed substantially between the x-axis of the multi-fiber fiber optic connector assembly and the y-axis of the multi-fiber fiber optic connector assembly.

In another embodiment, the present invention provides a multi-fiber fiber optic connector assembly providing articulated force application, including: a ferrule holder including an x-pivot component and a y-pivot component, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly; a multi-fiber ferrule comprising a plurality of optical connection points coupled to the ferrule holder; and a biasing member coupled to the ferrule holder and the multi-fiber ferrule, wherein the biasing member is operable for transferring a force through the ferrule holder and to the multi-fiber ferrule, and wherein the y-pivot component of the ferrule holder is coupled to the biasing member, the x-pivot component of the ferrule holder is coupled to the y-pivot component of the ferrule holder, and the multi-fiber ferrule is coupled to the x-pivot component of the ferrule holder. The x-axis and the y-axis of the multi-fiber fiber optic connector assembly are substantially separated in the z direction. The biasing member comprises one of a coil spring and a wave spring. The assembly also includes a shoulder structure integrally formed with the multi-fiber ferrule and disposed substantially between the x-axis of the multi-fiber fiber optic connector assembly and the y-axis of the multi-fiber fiber optic connector assembly.

In a further embodiment, the present invention provides a method for providing articulated force application, including: providing a ferrule holder including an x-pivot component and a y-pivot component, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly; providing a multi-fiber ferrule comprising a plurality of optical connection points coupled to the ferrule holder; and providing a biasing member coupled to the ferrule holder and the multi-fiber ferrule, wherein the biasing member is operable for transferring a force through the ferrule holder and to the multi-fiber ferrule. Preferably, the x-axis and the y-axis of the multi-fiber fiber optic connector assembly are substantially separated in the z direction. The y-pivot component of the ferrule holder is coupled to the biasing member. The x-pivot component of the ferrule holder is coupled to the y-pivot component of the ferrule holder. The multi-fiber ferrule is coupled to the x-pivot component of the ferrule holder. Preferably, the biasing member comprises one of a coil spring and a wave spring. The method also includes providing a shoulder structure integrally formed with the multi-fiber ferrule and disposed substantially between the x-axis of the multi-fiber fiber optic connector assembly and the y-axis of the multi-fiber fiber optic connector assembly.

It is to be understood that both the foregoing general description and the following detailed description present exemplary embodiments of the present invention, and provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

BRIEF DESCRIPTION OF THE DRAWINGS

The present invention is illustrated and described herein with reference to the various drawings, in which like reference numbers are used to denote like system components and/or method steps, as appropriate, and in which:

FIG. 11 is exploded and assembled perspective views and partial cross-sectional side and top views of the connector assembly of FIG. 1.

DETAILED DESCRIPTION OF THE INVENTION

In various embodiments, the present invention provides a multi-fiber fiber optic connector assembly in which the ferrules and ferrule holders are "force centered" and "balanced," such that the end faces of the ferrules are precisely aligned with one another. This is accomplished via pivot point and axis selection and ferrule shoulder locations, as is described in greater detail herein below. The present invention also provides a multi-fiber fiber optic connector assembly that utilizes a "bootless" ferrule. The ferrule of the present invention incorporates a defined attachment point for an articulated force assembly and a back end extension to aide in optical fiber insertion. Force application is provided proximate the front and center of the ferrule (i.e. the center of the fiber array). A "snap" receiving geometry is designed to retain the articulated force assembly without the need for consumables. The articulated joint utilized as an attachment for the ferrule provides a spring seat, a hinge in the x-axis, and a centering mechanism in the y-axis. The centering mechanism in the y-axis minimizes the side-load component and allows the coil spring to assume its natural angle, for example. The front surface of the ferrule becomes the load-bearing surface. Forces are guided towards the center of the ferrule in the y-axis by a rib structure. Movement in the y-axis is limited by the ferrule geometry, providing a relatively defined position in the multi-fiber fiber optic connector assembly. The hinge in the y-axis allows for movement in the x-axis, reducing the side-load component. The spring tilt is limited by the cavity that the multi-fiber fiber optic connector assembly sits in to prevent direct force coupling to the back end of the MT ferrule with an excessive out-of-squareness spring. Finally, a pin-keeper may be utilized, "snapped" over the multi-fiber fiber optic connector assembly and engaging the ferrule. Other force centering connector assemblies are described in co-pending U.S. patent application Ser. No. 11/449,237, filed on Jun. 8, 2006, and entitled "Fiber Optic Connector for Applying Axial Biasing Force to Multifiber Ferrule," as well as co-pending U.S. patent application Ser. No. 11/546,232, filed on Oct. 11, 2006, and entitled "Connector Assembly having Multi-Fiber Ferrule with Force Centering," both of which are incorporated herein by reference.

Figure 1:
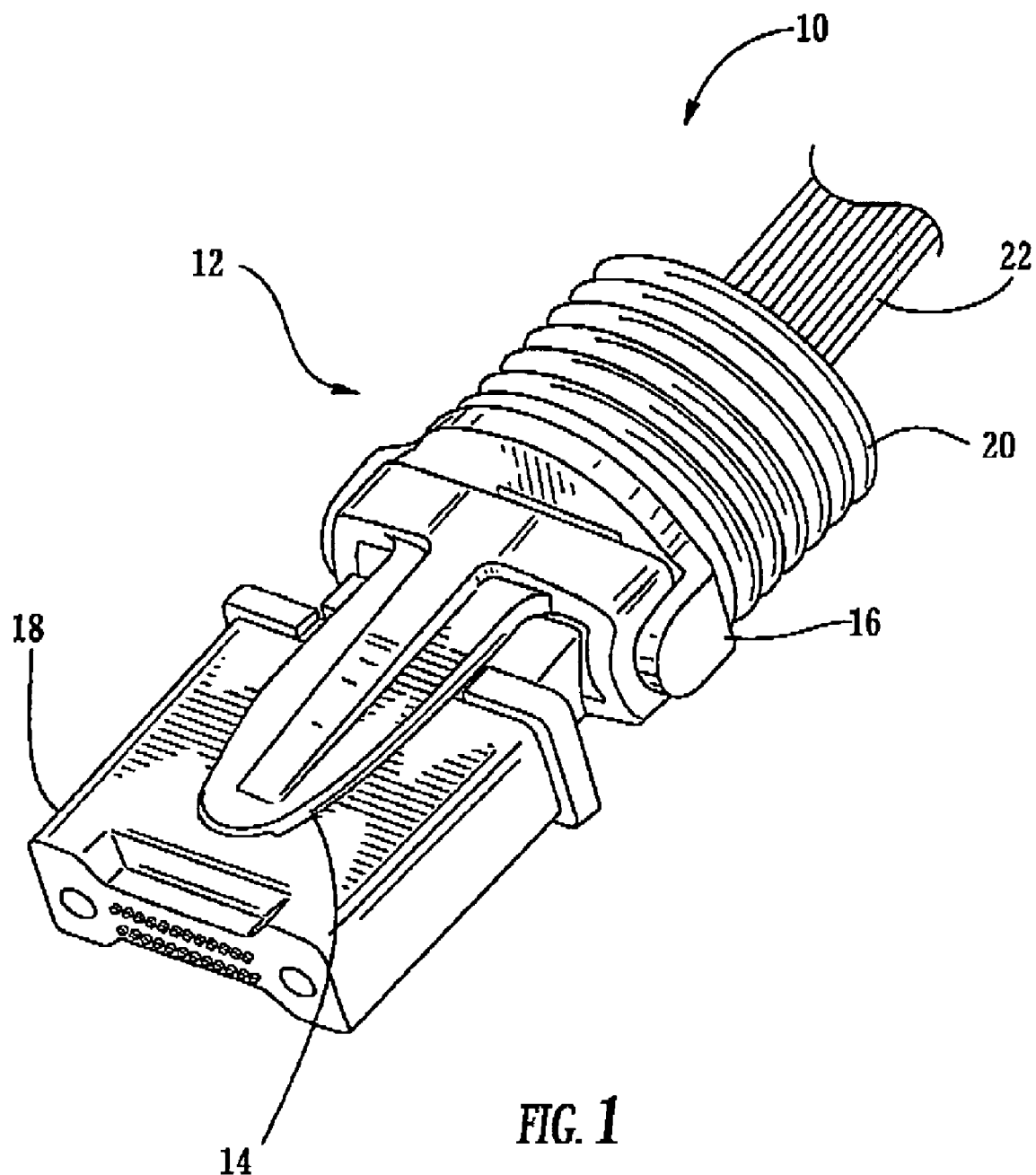
FIG. 1 shows perspective views of one embodiment of a connector assembly including a ferrule incorporating an x-pivot, a ferrule holder incorporating a corresponding x-pivot and a y-pivot, a spring, and ferrule guide pins.
Figure 10:
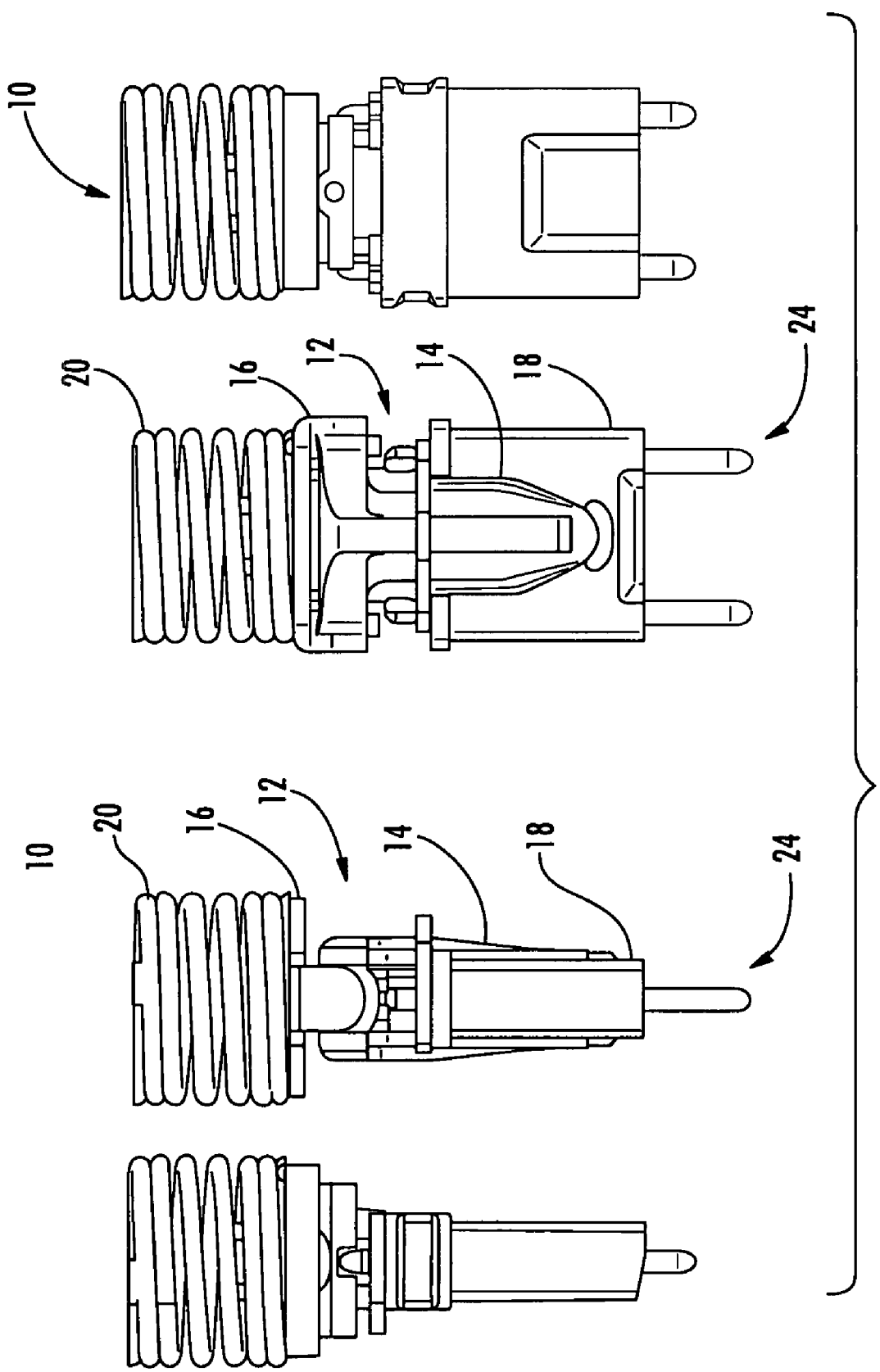
FIG. 10 is a series of planar side views of the connector assembly of FIG. 1.
Figure 17:
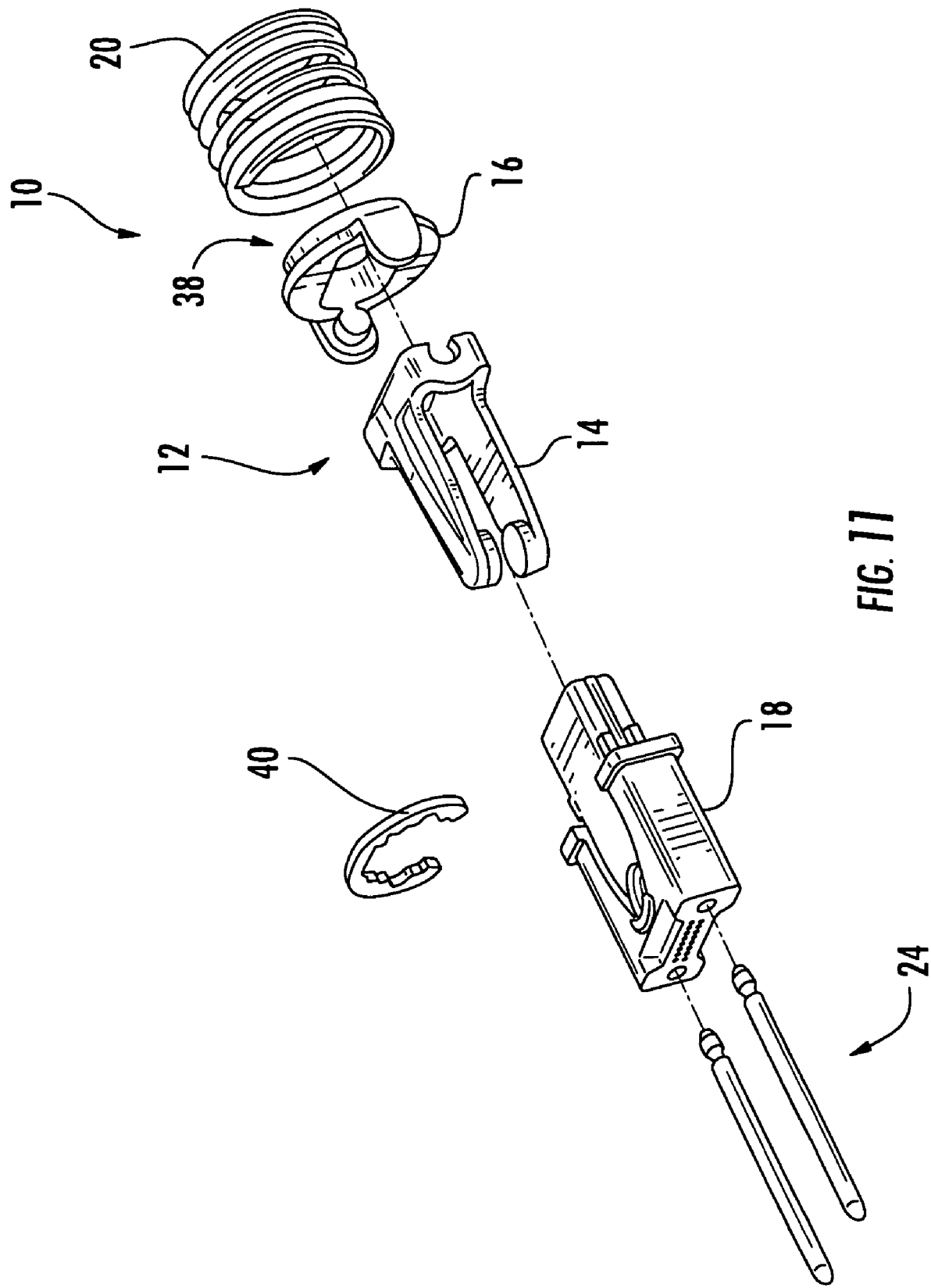

Referring to FIG. 1 (see also FIG. 10), the multi-fiber fiber optic connector assembly 10 of the present invention includes a ferrule holder 12 consisting of an x-pivot component and a y-pivot component 16. The x-pivot component 14 "snappingly" and/or pivotably engages the y-pivot component 16 and is allowed to pivot several degrees about the y-axis of the multi-fiber fiber optic connector assembly 10. A ferrule 18 "snappingly" and/or pivotably engages the x-pivot component 14 and is allowed to pivot several degrees about the x-axis of the multi-fiber fiber optic connector assembly 10. Preferably, these x-axis and y-axis pivot points are not coplanar in the z direction. A spring 20, also referred to herein as a "biasing member", such as a coil spring, a wave spring or the like engages the y-pivot component 16 of the multi-fiber fiber optic connector assembly 10 and one or more optical fibers 22 pass therethrough to engage the ferrule 18, optically coupling the one or more optical fibers 22 and the ferrule 18. A plurality of ferrule guide pins 24 are utilized to mechanically align mating ferrules.

In the above configuration, force is provided by the spring 20 and is transferred to the y-pivot component 16, the x-pivot component 14, and, eventually, the ferrule 18. Squareness problems associated with the face of the ferrule 18 are compensated for by the hinged joints joining the y-pivot component 16, the x-pivot component 14, and the ferrule 18. By allowing the end portion of the spring 20 to assume its natural orientation, the transmitted torque is minimized. Advantageously, the force is applied to the front portion of the ferrule 18, thus reducing the resulting moment arm of any off-center force, about both the x-axis and the y-axis. For example, the resulting moment arm about the critical x-axis is reduced by more than about 8 mm (80%) and the possibility of applying excessive off-axis force is greatly reduced.

Figure 2:
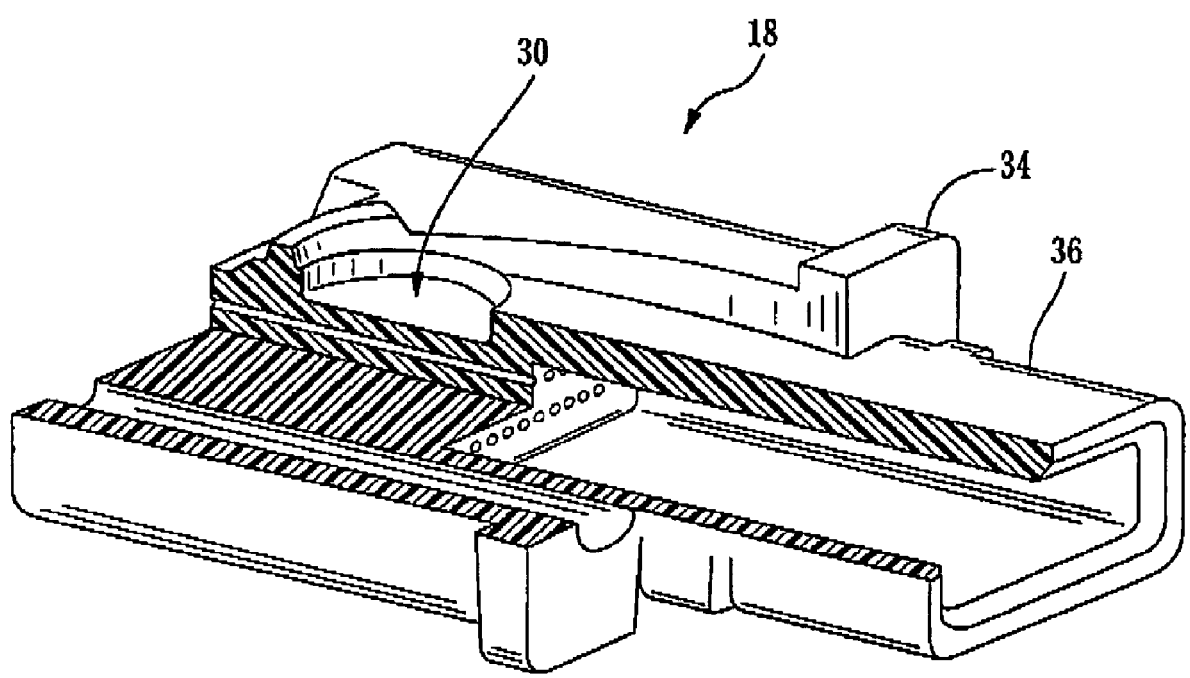
FIG. 2 is a transparent cut-away perspective view of the ferrule of FIG. 1, highlighting the area of force application and including an integrated boot.
Figure 3:
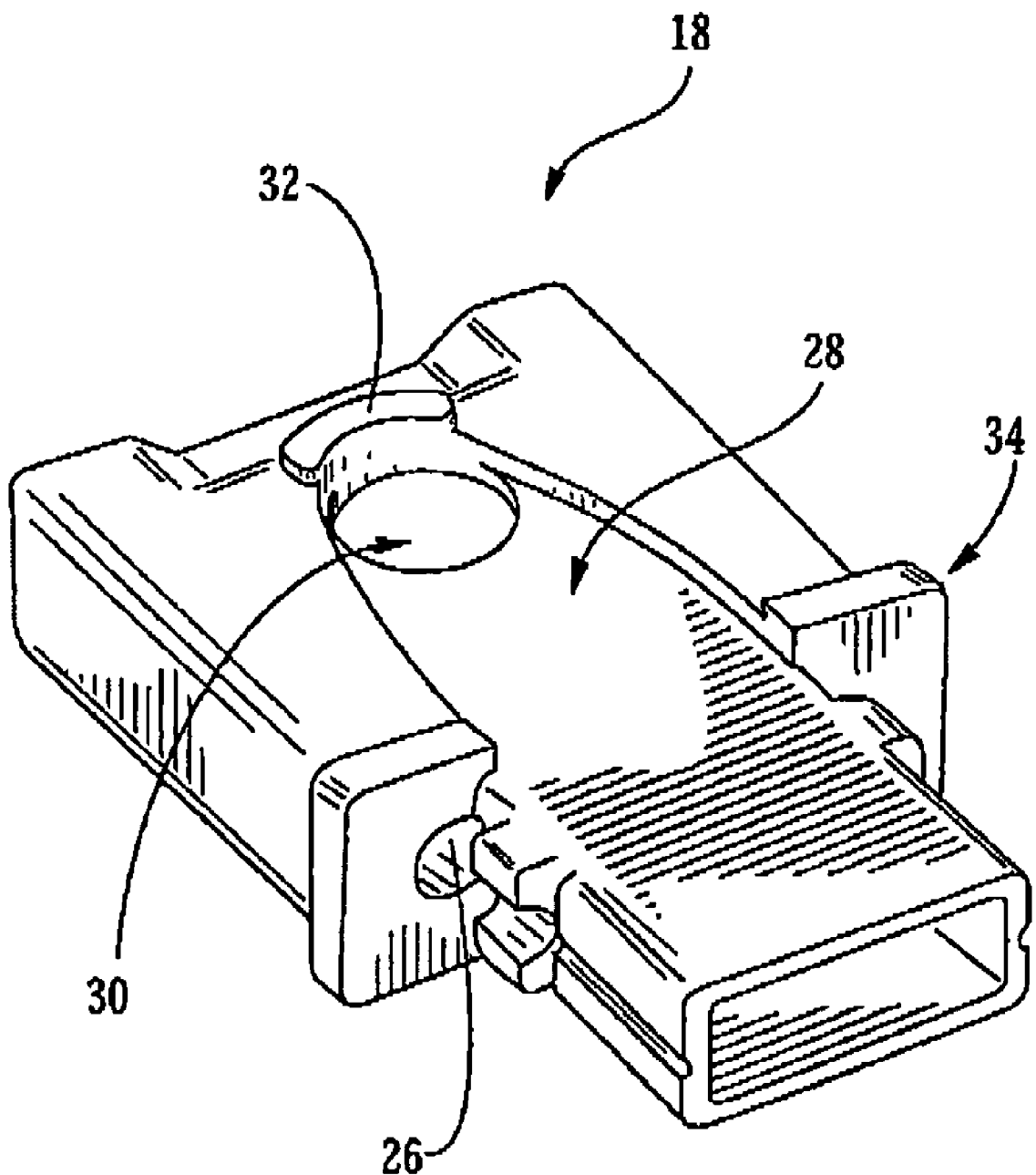
FIG. 3 is a perspective view of the ferrule of FIGS. 1 and 2 including a bearing surface.
Figure 4:
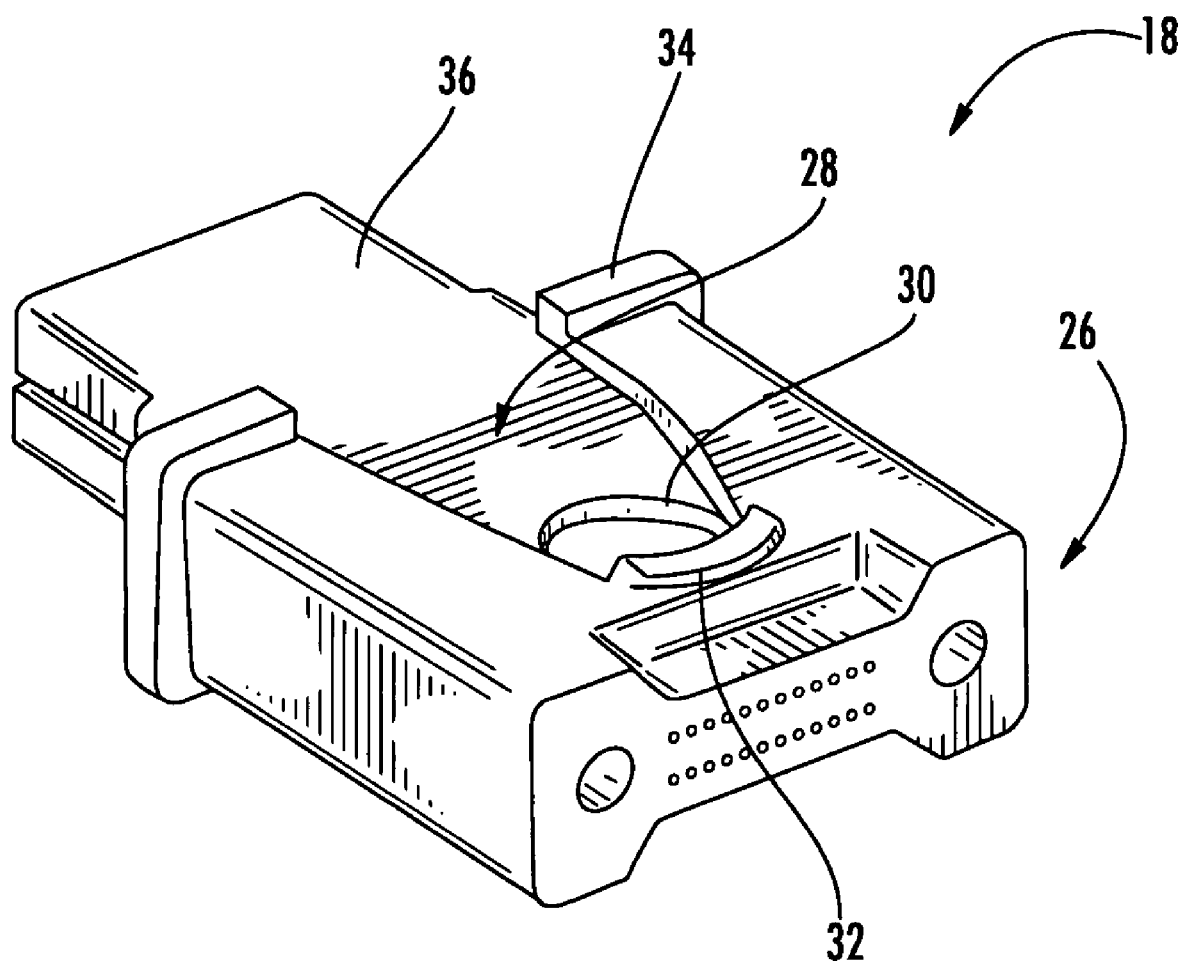
FIG. 4 is another perspective view of the ferrule of FIGS. 1 and 2 including a pivot guide.

Referring to FIGS. 2-4, the ferrule 18 of the present invention may be a ferrule having multiple rows of multiple optical fibers each, and that accommodates multiple stacks of optical fibers arranged in a ribbon or individual fibers, for example. Thus, the ferrule 18 presents a fiber array. The ferrule 18 includes a plurality of bores 26 disposed therethrough for receiving the guide pins 24. The top and bottom surfaces of the ferrule 18 each include a recessed pivot guide 28 and pivot depression 30 that, when engaged with the x-pivot component 14 (FIG. 1) of the ferrule holder 12 (FIG. 1), form an articulated force-transfer mechanism. Specifically, the area of force application is a bearing surface 32 manufactured into the front portion of the pivot depression 30 of the ferrule 18. The shoulder 34 of the ferrule 18 is located in an industry-standard position on the surface of the ferrule 18, such that the ferrule 18 of the present invention is interchangeable with conventional ferrules. The shoulder 34 of the ferrule 18 is, however, reduced in height, such that the lower overall moment arm of the ferrule 18 is reduced. The ferrule 18 includes an extension component 36 that is configured to receive and guide the one or more optical fibers 22 (FIG. 1) that are optically coupled to the ferrule 18. Advantageously, this extension component 36 replaces a conventional boot and provides increased area for epoxy retention. The guiding of the one or more optical fibers 22 is assisted by reduced cavity dimensions, aiding in fiber ribbon alignment.

Figure 5:
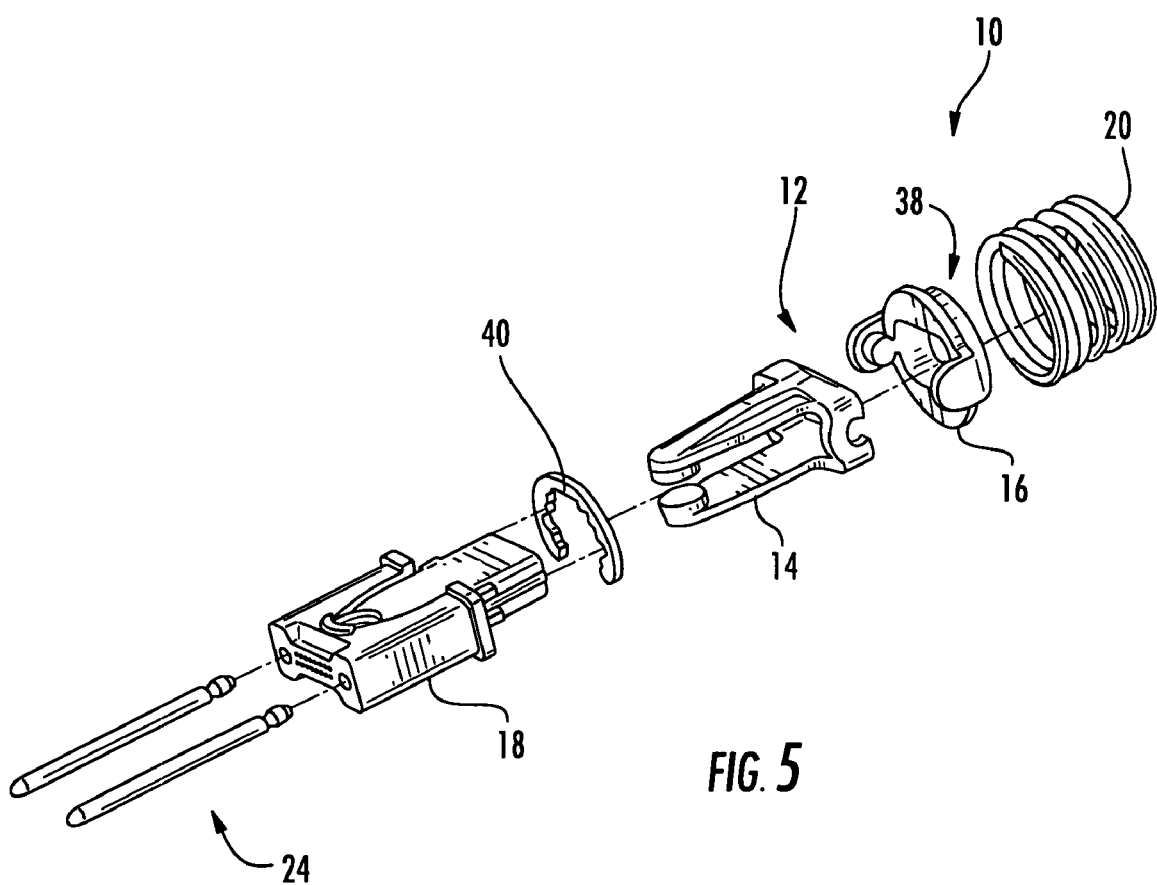
FIG. 5 is an exploded perspective view of the connector assembly of FIG. 1 including a pin-keeper.

FIG. 5 illustrates the multi-fiber connector assembly 10 in an exploded configuration (see also FIG. 11). Of note, the spring 20 engages a spring seat 38 that is manufactured into the y-pivot component 16 of the ferrule holder 12 and, optionally, a pin-keeper 40 is "snapped" over the ferrule 18, engaging and retaining the guide pins 24. This "snap-in" configuration allows for the components of the connector assembly 10 to be assembled without the need for glue and/or fixtures. The ferrule 18 is first "snapped" into the x-pivot component 14, forming a hinge. Optionally, the pin-keeper 40 is installed at this time. The x-pivot component 14 is then "snapped" into the y-pivot component 16, forming another hinge. Finally, the spring 20 secures the fit of the articulated joint. Both the spring 20 and the guide pins 24 are installed after ferrule polishing.

Figure 6:
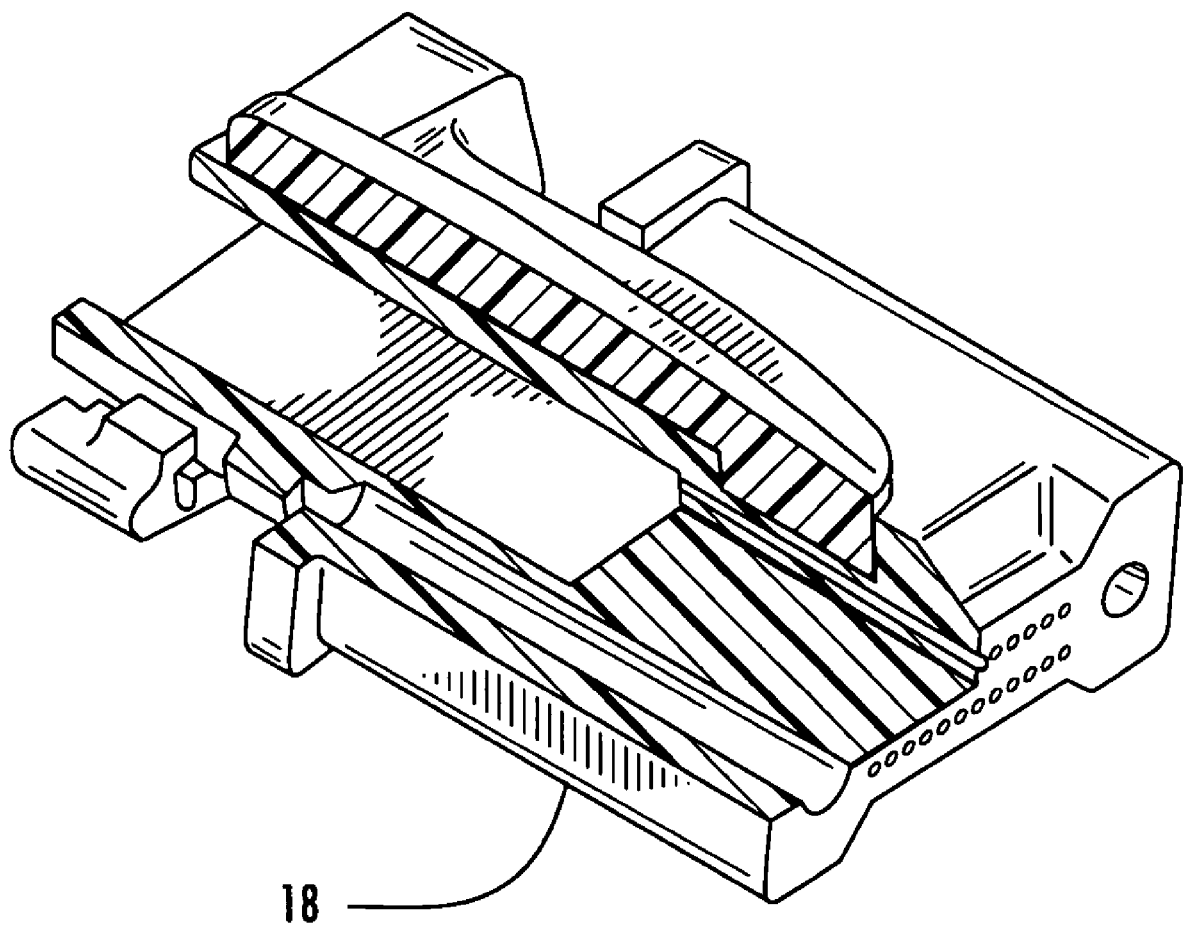
FIG. 6 is a cut-away perspective view of the ferrule of FIGS. 1 and 2 highlighting the resulting force.
Figure 7:
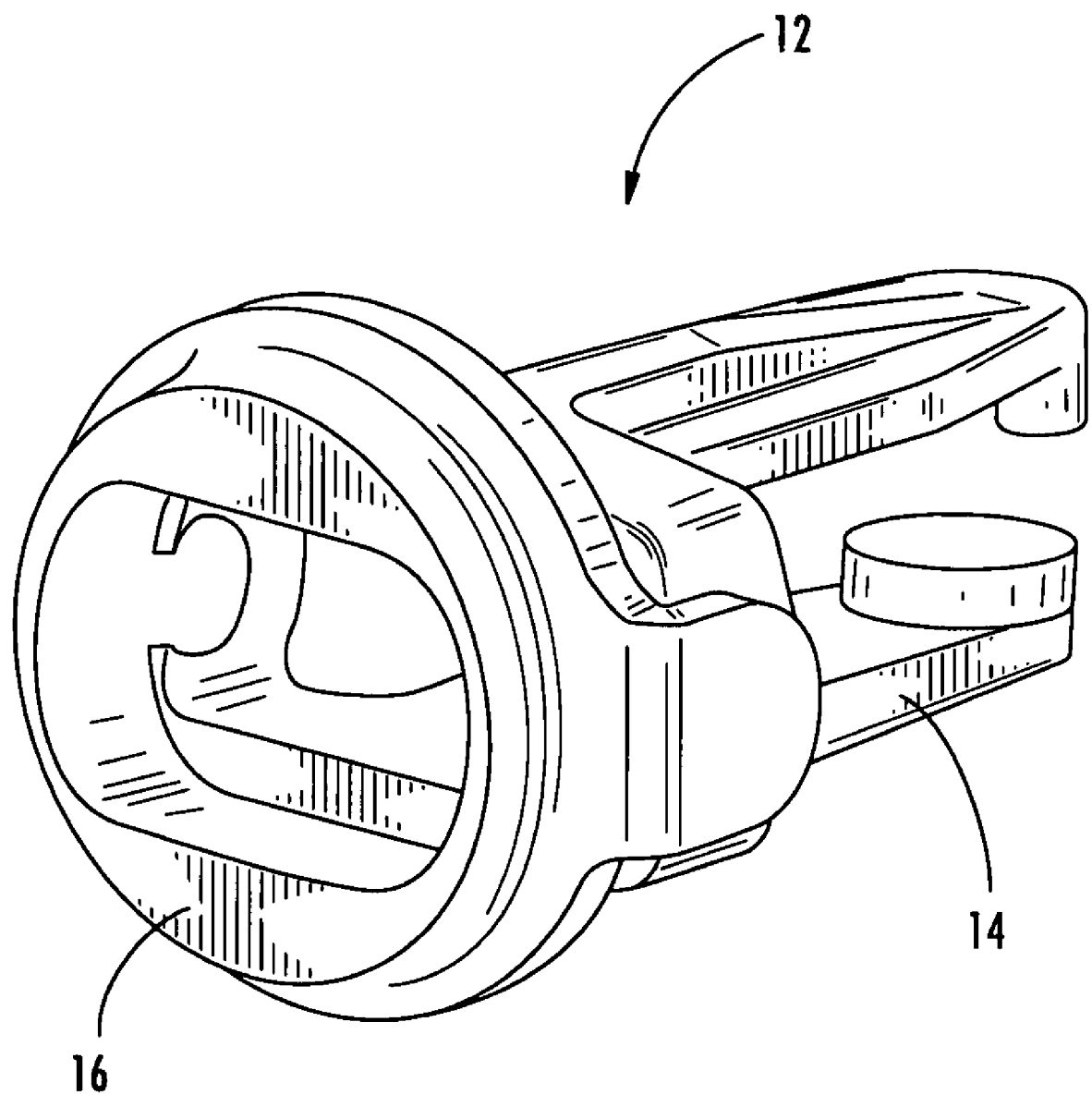
FIG. 7 is a perspective view of the ferrule holder of FIG. 1 highlighting the area of force application and including a plurality of hinged snaps and a spring seat

FIG. 6 illustrates the resulting force experienced by the ferrule 18 and FIG. 7 illustrates the pivot points associated with the ferrule holder 12.

Figure 8:
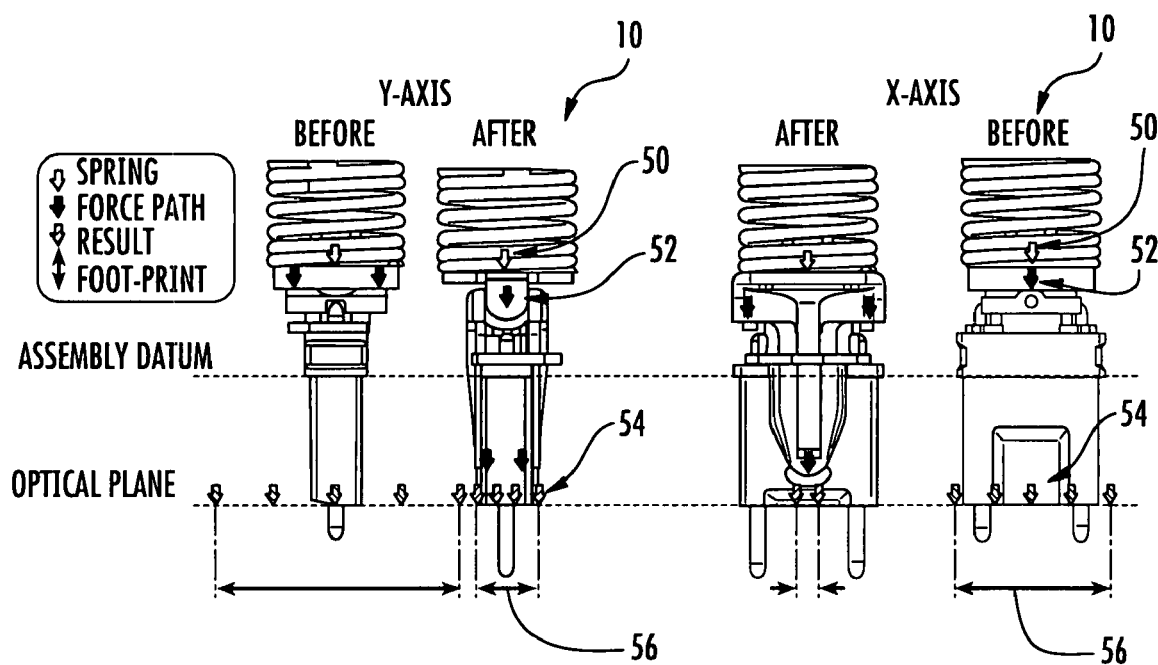
FIG. 8 is a series of planar side views of the connector assembly of FIG. 1 highlighting the resulting force.

FIG. 8 illustrates the spring force 50, force path 52, force result 54, and footprint 56 in the optical plane associated with both the x-axis and the y-axis of the multi-fiber fiber optic connector assembly 10 (FIG. 1) of the present invention. It is instructive to note that the articulated force application systems and methods of the present invention significantly reduce the footprint 56 as compared to conventional systems and methods.

Figure 9:
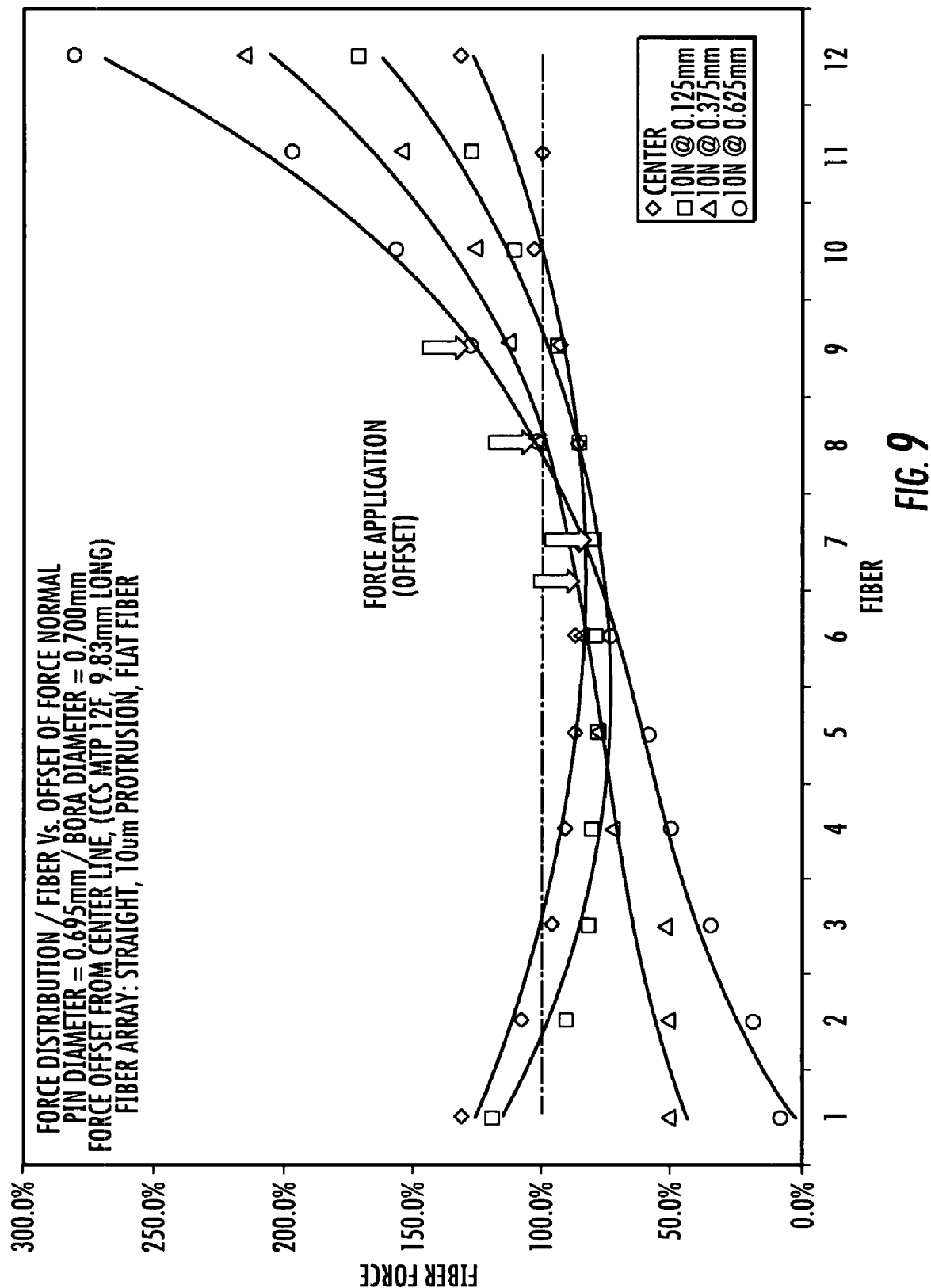
FIG. 9 is a graph illustrating the force distribution per fiber vs. offset of force normal obtained via the connector assembly of FIG. 1.

FIG. 9 illustrates the force distribution per fiber vs. offset of force normal obtained via the multi-fiber fiber optic connector assembly 10 (FIG. 1) of the present invention.

Figure 12:
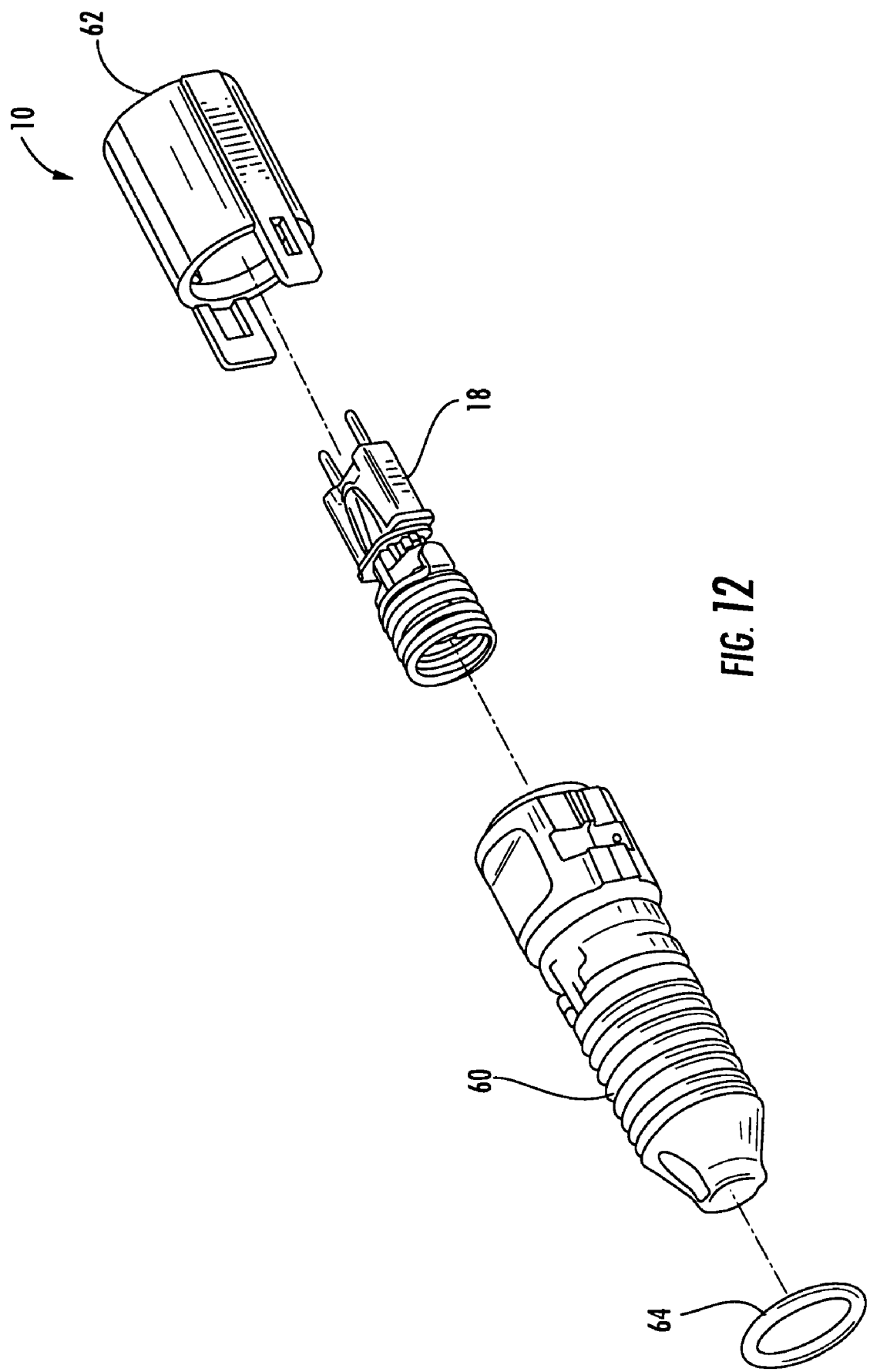
FIG. 12 is exploded and assembled perspective views and partial cross-sectional side and top views of the connector assembly of FIG. 1 including a housing and dust cap.

Referring to FIG. 12, the multi-fiber fiber optic connector assembly 10 of the present invention also includes a housing 60 and alignment structure within or integral with the housing 60. Optionally, the ferrule 18 of the present invention incorporates a plurality of blind holes (not illustrated) that are configured to receive a plurality of guard or "dummy" fibers (not illustrated), such as a plurality of 250 μm guard fibers or the like. Advantageously, these guard fibers, disposed near the edges of the end face of the ferrule 18, ensure that all optical fibers are polished evenly, for example, providing "buffer" fibers near the edges of the ferrule 18. In addition, the guard fibers assist the end faces in touching with proper force when mated by keeping the overall optical fiber count relatively high and absorb undesirable optical fiber movement. Conventional multi-fiber fiber optic connector assemblies may use the same spring force for optical fiber counts ranging from 2 to 24 optical fibers. At higher optical fiber counts, the per fiber optical fiber loading is minimized. Below around 8 optical fibers, the loading becomes such that undesirable optical fiber movement may take place. Thus, a relatively high overall optical fiber count is desirable. The guard fibers may also consist of steel fibers, fused quartz fibers, sapphire fibers, etc.

The end face of the ferrule 18 of the present invention may have a variety of configurations. For a ferrule accommodating stacked fiber ribbons, extra columns of guard fibers may be added along the edges of the rows of optical fibers. The optical fibers are 180 μm or 250 μm coated optical fibers, for example, with 180 μm or 250 μm horizontal and vertical spacing, for example. For a ferrule accommodating partitioned fiber ribbons, extra columns of guard fibers may be added along the edges of the rows of optical fibers. The optical fibers are 180 μm or 250 μm coated optical fibers, for example, with 180 μm or 250 μm horizontal spacing and greater than 180 μm or 250 μm horizontal spacing, for example. For a ferrule accommodating partitioned fiber ribbons, extra columns of guard fibers may be added along the edges of the rows of optical fibers and additional guard fibers may be added in the corners of the rows of optical fibers. The optical fibers are 180 μm or 250 μm coated optical fibers, for example, with 180 μm or 250 μm horizontal spacing and greater than 180 μm or 250 μm horizontal spacing, for example. For a ferrule accommodating stacked or partitioned fiber ribbons, extra columns of guard fibers may be added along the edges of the rows of optical fibers and blind holes for add-in glass bumpers may be added in the corners of the end face of the ferrule 18. The optical fibers are 180 μm or 250 μm coated optical fibers, for example, with 180 μm or 250 μm horizontal spacing and greater than or equal to 180 µm or 250 µm horizontal spacing, for example.

The rear portion of the ferrule 18 of the present invention may include a plurality of substantially horizontal partitions (not illustrated) for dividing and holding the partitioned stack of optical fiber ribbons. These may be 100 µm or 200 µm partitions, for example.

Likewise, the rear portion of the ferrule 18 of the present invention may also include a fin structure (not illustrated) that is configured to receive, retain, and protect the stacked ribbons. Specifically, the fin structure is configured to protect the guide pin holes of the ferrule 18 from epoxy infiltration during stacked ribbon insertion and fixturing. The end face of the ferrule of the present invention may further include one or more bumper features (not illustrated) or the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A multi-fiber fiber optic connector assembly providing articulated force application, comprising:
   a ferrule holder comprising an x-pivot component including a first through passage and a y-pivot component including a second through passage in communication and generally aligned with the first through passage, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly;
   a multi-fiber ferrule comprising a plurality of optical connection points coupled to the ferrule holder; and
   a biasing member coupled to the ferrule holder and the multi-fiber ferrule, wherein the biasing member is operable for transferring a force through the ferrule holder and to the multi-fiber ferrule.

2. The multi-fiber fiber optic connector assembly of claim 1, wherein the x-axis and the y-axis of the multi-fiber fiber optic connector assembly are substantially separated in the z direction.

3. The multi-fiber fiber optic connector assembly of claim 1, wherein the y-pivot component of the ferrule holder is coupled to the biasing member.

4. The multi-fiber fiber optic connector assembly of claim 3, wherein the x-pivot component of the ferrule holder is coupled to the y-pivot component of the ferrule holder.

5. The multi-fiber fiber optic connector assembly of claim 4, wherein the multi-fiber ferrule is coupled to the x-pivot component of the ferrule holder.

6. The multi-fiber fiber optic connector assembly of claim 1, wherein the biasing member comprises one of a coil spring and a wave spring.

7. The multi-fiber fiber optic connector assembly of claim 1, further comprising a shoulder structure integrally formed with the multi-fiber ferrule and disposed substantially between the x-axis of the multi-fiber fiber optic connector assembly and the y-axis of the multi-fiber fiber optic connector assembly.

8. The multi-fiber fiber optic connector assembly of claim 1, wherein the x-pivot component of the ferrule holder and the y-pivot component of the ferrule holder act cooperatively to minimize the torque force experienced by the face of the multi-fiber ferrule.

9. A multi-fiber fiber optic connector assembly providing articulated force application, comprising:
   a ferrule holder comprising an x-pivot component including a first through passage and a y-pivot component including a second through passage in communication and generally aligned with the first through passage, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly;
   a multi-fiber ferrule comprising a plurality of optical connection points coupled to the ferrule holder; and
   a biasing member coupled to the ferrule holder and the multi-fiber ferrule, wherein the biasing member is operable for transferring a force through the ferrule holder and to the multi-fiber ferrule, and wherein the y-pivot component of the ferrule holder is coupled to the biasing member, the x-pivot component of the ferrule holder is coupled to the y-pivot component of the ferrule holder, and the multi-fiber ferrule is coupled to the x-pivot component of the ferrule holder.

10. The multi-fiber fiber optic connector assembly of claim 9, wherein the x-axis and the y-axis of the multi-fiber fiber optic connector assembly are substantially separated in the z direction.

11. The multi-fiber fiber optic connector assembly of claim 9, further comprising a shoulder structure integrally formed with the multi-fiber ferrule and disposed substantially between the x-axis of the multi-fiber fiber optic connector assembly and the y-axis of the multi-fiber fiber optic connector assembly.

12. The multi-fiber fiber optic connector assembly of claim 9, wherein the x-pivot component of the ferrule holder and the y-pivot component of the ferrule holder act cooperatively to minimize the torque force experienced by the face of the multi-fiber ferrule.

13. A multi-fiber fiber optic connection method providing articulated force application, comprising:
   providing a ferrule holder comprising an x-pivot component including a first through passage and a y-pivot component including a second through passage in communication and generally aligned with the first through passage, wherein the x-pivot component of the ferrule holder is operable for providing relative rotational movement about the x-axis of the multi-fiber fiber optic connector assembly and the y-pivot component of the ferrule holder is operable for providing relative rotational movement about the y-axis of the multi-fiber fiber optic connector assembly;
   providing a multi-fiber ferrule comprising a plurality of optical connection points coupled to the ferrule holder; and
   providing a biasing member coupled to the ferrule holder and the multi-fiber ferrule, wherein the biasing member is operable for transferring a force through the x-pivot component and the y-pivot component of the ferrule holder and to the multi-fiber ferrule.

14. The multi-fiber fiber optic connection method of claim 13, wherein the x-axis and the y-axis of the multi-fiber fiber optic connector assembly are substantially separated in the z direction.

15. The multi-fiber fiber optic connection method of claim 13, wherein the y-pivot component of the ferrule holder is coupled to the biasing member.

16. The multi-fiber fiber optic connection method of claim 15, wherein the x-pivot component of the ferrule holder is coupled to the y-pivot component of the ferrule holder.

17. The multi-fiber fiber optic connection method of claim 16, wherein the multi-fiber ferrule is coupled to the x-pivot component of the ferrule holder.

18. The multi-fiber fiber optic connection method of claim 13, wherein the biasing member comprises one of a coil spring and a wave spring.

19. The multi-fiber fiber optic connection method of claim 13, further comprising providing a shoulder structure integrally formed with the multi-fiber ferrule and disposed substantially between the x-axis of the multi-fiber fiber optic connector assembly and the y-axis of the multi-fiber fiber optic connector assembly.

20. The multi-fiber fiber optic connection method of claim 13, wherein the x-pivot component of the ferrule holder and the y-pivot component of the ferrule holder act cooperatively to minimize the torque force experienced by the face of the multi-fiber ferrule.

21. The multi-fiber fiber optic connector assembly of claim 1, wherein the biasing member is operable for transferring the force through the x-pivot component and the y-pivot component.

22. The multi-fiber fiber optic connector assembly of claim 9, wherein the biasing member is operable for transferring the force through the x-pivot component and the y-pivot component.

\* \* \* \* \*